United States Patent
McMurtry

(10) Patent No.: US 6,397,485 B1
(45) Date of Patent: *Jun. 4, 2002

(54) COUNTERBALANCED COORDINATE POSITIONING MACHINE

(75) Inventor: David R McMurtry, Wotton-under-Edge (GB)

(73) Assignee: Renishaw, PLC, Gloucestershire (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/341,332

(22) PCT Filed: Nov. 20, 1998

(86) PCT No.: PCT/GB98/03482

§ 371 (c)(1),
(2), (4) Date: Jul. 9, 1999

(87) PCT Pub. No.: WO99/27320

PCT Pub. Date: Jun. 3, 1999

(30) Foreign Application Priority Data

Nov. 20, 1997 (GB) ............................................. 9724453

(51) Int. Cl.$^7$ .............................................. B01B 5/008
(52) U.S. Cl. .......................................... 33/503; 33/555
(58) Field of Search .......................... 33/503, 1 M, 549, 33/551, 553, 554, 555, 556, 558, 568, 569, 572, 573, 574, 577; 414/917; 248/123.2, 123.11

(56) References Cited

U.S. PATENT DOCUMENTS

| | | |
|---|---|---|
| 4,937,948 A | 7/1990 | Herzog et al. |
| 4,976,582 A | 12/1990 | Clavel |
| 5,029,398 A | 7/1991 | Ertl |
| 5,276,974 A * | 1/1994 | Chanoni et al. ............... 33/503 |
| 5,797,191 A * | 8/1998 | Ziegert ......................... 33/503 |
| 5,836,082 A * | 11/1998 | Sheldon ........................ 33/556 |
| 5,887,356 A * | 3/1999 | Sheldon ........................ 33/556 |

FOREIGN PATENT DOCUMENTS

| | | |
|---|---|---|
| EP | 0 102 744 B1 | 3/1984 |
| EP | 0 508 670 A2 | 10/1992 |
| EP | 0 674 969 A1 | 4/1995 |

* cited by examiner

Primary Examiner—Christopher W. Fulton
(74) Attorney, Agent, or Firm—Oliff & Berridge, PLC

(57) ABSTRACT

A coordinate positioning machine has an operating module such as a tool or probe (10) mounted for translational motion relative to a table (16) with three degrees of freedom by means of three articulated linkages (18). Each of the linkages is made up of a torsion box (22) which is pivotally mounted to a vertical pillar (20) with one degree of freedom, and a pair of struts (26), each of which is pivotally mounted with two degrees of freedom to the torsion box at one end, and to the operating module at the other. The linkages cooperate to prevent all rotational motion of the operating module, while allowing translation. Motion of the operating module is actuated manually, and the mass thereof is counterbalanced by an articulated counterbalance arm 90 which guides a cable 96 that is in turn connected to a fusee. Displacement of the operating module is measured using scale and readhead encoders (40,50). Motion of the operating module can be restricted to a single plane by means of locking devices (132) operating between the struts 26, thereby to enable scanning of a surface in a series of parallel planes.

10 Claims, 4 Drawing Sheets

COUNTERBALANCED COORDINATE POSITIONING MACHINE

The present invention relates to a coordinate positioning machine, such as a robot or a coordinate measuring machine used to measure the position, form, or dimension of components, for example.

One well known type of coordinate positioning machine has a "Cartesian" configuration, in which an operating module (which may incorporate a probe, for example) is supported for movement relative to a base (such as a table) with three translational degrees of freedom by means of three "serially" mounted (i.e. one on top of another), mutually orthogonal linear guideways. In an alternative support configuration, an operating module is supported for movement relative to a table with three translational degrees of freedom by three articulating linkages, each of which is connected directly between the operating module and a support member which forms part of the base. Such a "parallel" mounting configuration for a machine is known from EP 102744 and U.S. Pat. No. 4,976,582, for example.

Various aspects of the present invention relate to the provision of a machine configuration of the parallel type.

A first aspect of the present invention provides a coordinate positioning machine having a base and an operating module interconnected by three linkages which cooperate to prevent relative rotation of the base and the operating module, but permit relative translational motion of the base and the operating module, the machine further comprising selectively operable locking means which constrains the operating module to move in a locked plane relative to the base.

One of the advantages of such a machine configuration is that it provides the user with the ability to operate such a machine manually to scan the profile of an object in a series of parallel planes for the purpose, for example, of obtaining a data map of its surface. Preferably the machine includes a pair of selectively operable locking means which are actuable to constrain relative motion of the base and operating module in non-parallel planes, the displacement of which within the working area of the machine is determined on the basis of the position of the operating module at the instant when the locking means are actuated to constrain the relative motion.

Accordingly, one preferred embodiment of the machine includes: first and second selectively operable locking means, wherein locked planes in which relative motion of the operating module and base is constrained by the first locking means are non-parallel to locked planes in which relative motion is constrained by the second locking means.

In a further preferred embodiment of the machine the position of a locked plane in which the operating module is constrained to move by the selectively operable locking means is selectable by the user of the machine on the basis of an instantaneous position of the operating module at an instant when the selectively operable locking means is actuated to constrain motion of the operating module.

Preferably at least one of the linkages has first and second limbs which are pivotally interconnected with two degrees of rotational freedom, the first limb comprising a pair of elongate struts which are pivotally mounted with two degrees of rotational freedom at one end to one of the base and operating module, and at the other end to the second limb, and the second limb is pivotally mounted to the other of the base and the operating module with one degree of freedom about an axis of articulation, wherein the selectively operable locking means operates between the struts of the first limb.

A preferred feature of such an embodiment provides that each of the locking means comprises an elongate clamp connected at each of its ends to one of the struts, wherein when the clamp is not operating, its length increases and decreases with pivoting of the limbs, and when the clamp is operating it is operable to maintain its length at a constant value.

In an independent aspect of the present invention, relative displacement of the base and the operating module in a machine of the parallel type is determined by means of a plurality of encoders. According to this aspect of the present invention, there is provided a coordinate positioning machine having a base and an operating module interconnected by three linkages which cooperate to prevent relative rotation of the base and the operating module, but permit relative translational motion of the base and the operating module, each of the linkages having first and second limbs pivotally interconnected with two degrees of rotational freedom, the first limb being pivotally mounted at one end with two rotational degrees of freedom to one of the base and the operating module, and at the other end to the second limb, and the second limb being pivotally mounted to the other of the base and operating module with one degree of freedom about an axis of articulation, wherein relative displacement of the operating module and base is determined by means of three or more encoders, each encoder having:

a scale which is mounted to an arcuate substrate and is defined by a series of spaced-apart lines;

a readhead mounted in register with the scale, the scale and the readhead being relatively moveable in a direction of spacing of the lines;

the substrate being mounted to one of: the base, the operating module, and a limb of the linkage;

the readhead being mounted to a part of the machine on which the scale substrate is not mounted, such that the readhead and scale substrate are pivotable relative to one another about an axis substantially coincident with the geometric centre of the arcuate scale substrate.

Preferably the readhead is mounted to the base, and the arcuate substrate is mounted to the second limb, wherein the geometric centre of the arcuate substrate lies substantially coincident with the axis of articulation.

In a further preferred embodiment, the base includes a table which, in use, supports an object which is to be operated upon by the machine, and a pillar extending upwardly from the base, wherein the linkages extend transversely from the pillar to the operating module, so that during motion of the operating module toward and away from the pillar, the operating module traverses the table, wherein the readhead is mounted to the pillar and the second limb is mounted at one end to the pillar.

The encoders may be opto-electronic, magnetic or capacitive, for example.

Desirably, the base and operating module have a mechanical reference position at which their relative displacement is repeatable. This enables the encoders, and any associated error map, to be initialised at the same mechanical position each time. Preferably the mechanical reference position will also serve as a detent mechanism by means of which the operating module may be retained in a "parked" position relative to the base when the machine is not in use.

Preferably, the machine will also have a configuration which prevents unwanted relative motion of the base and operating module. Accordingly, a further independent aspect of the present invention provides a coordinate positioning machine having a base and an operating module interconnected by three linkages which cooperate to prevent relative rotation of the base and the operating module, but permit relative linear motion of the base and the operating module, wherein the effect of gravitational force on the operating module is counteracted by one or more counterbalancing devices which act to suspend the operating module relative to the base when no external forces act on the operating module.

The nature of the operating module is dependant upon the nature of the tasks the user of the machine may wish to perform. For example, as mentioned above, the operating module may include either a trigger or a measuring probe (which may be either a contact or a non-contact probe), a cutting tool, or a welding arm, gripper or paint spraying nozzle, for example. The operating module may also include an articulating head for orienting such a probe (for example) with one or more degrees of rotational freedom relative to the base.

Embodiments of the invention will now be described, by way of example, and with reference to the accompanying drawings, in which.

Figure 1:
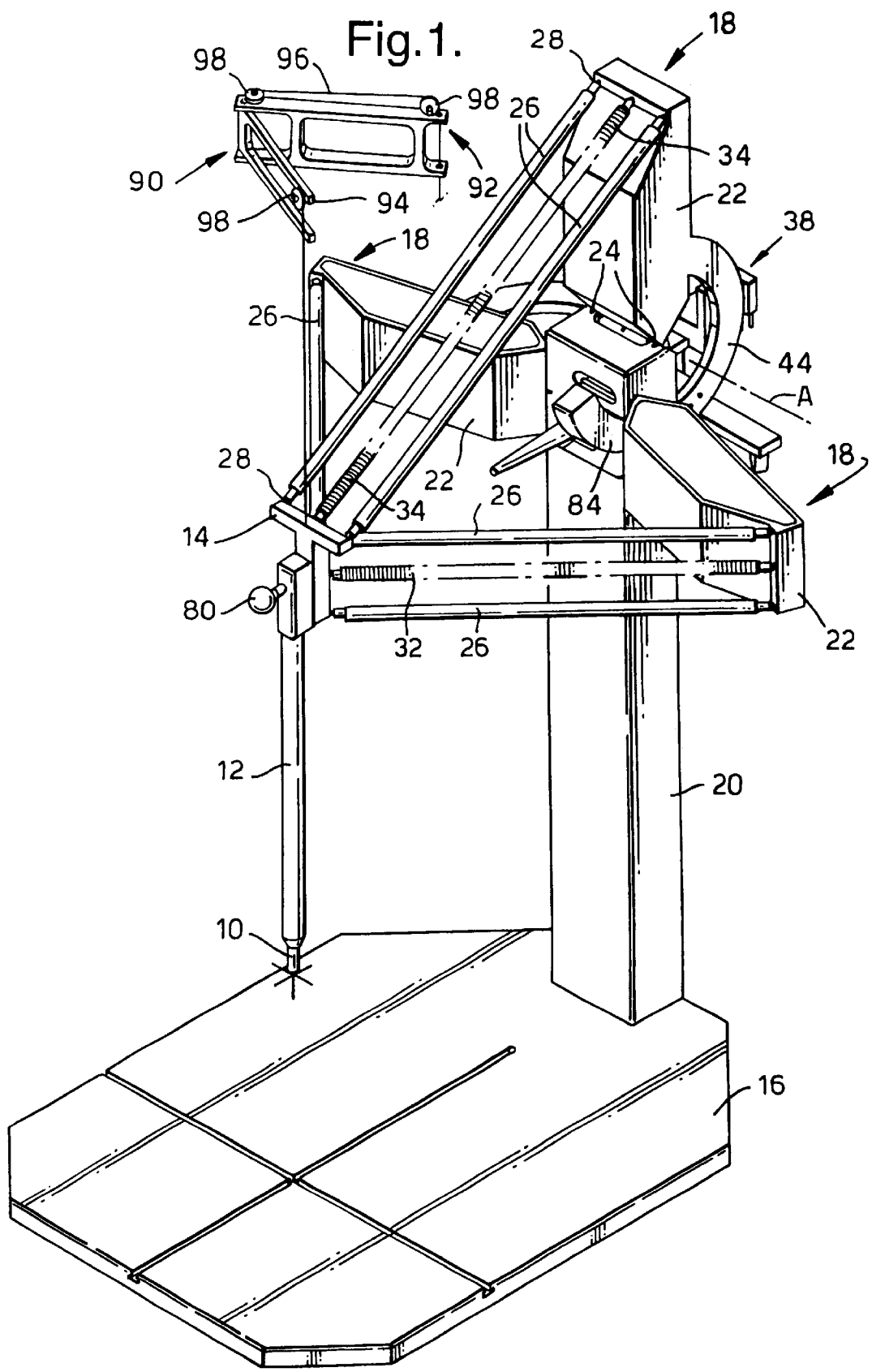
FIG. 1 is a front perspective view of a first embodiment of machine according to the present invention.
Figure 2:
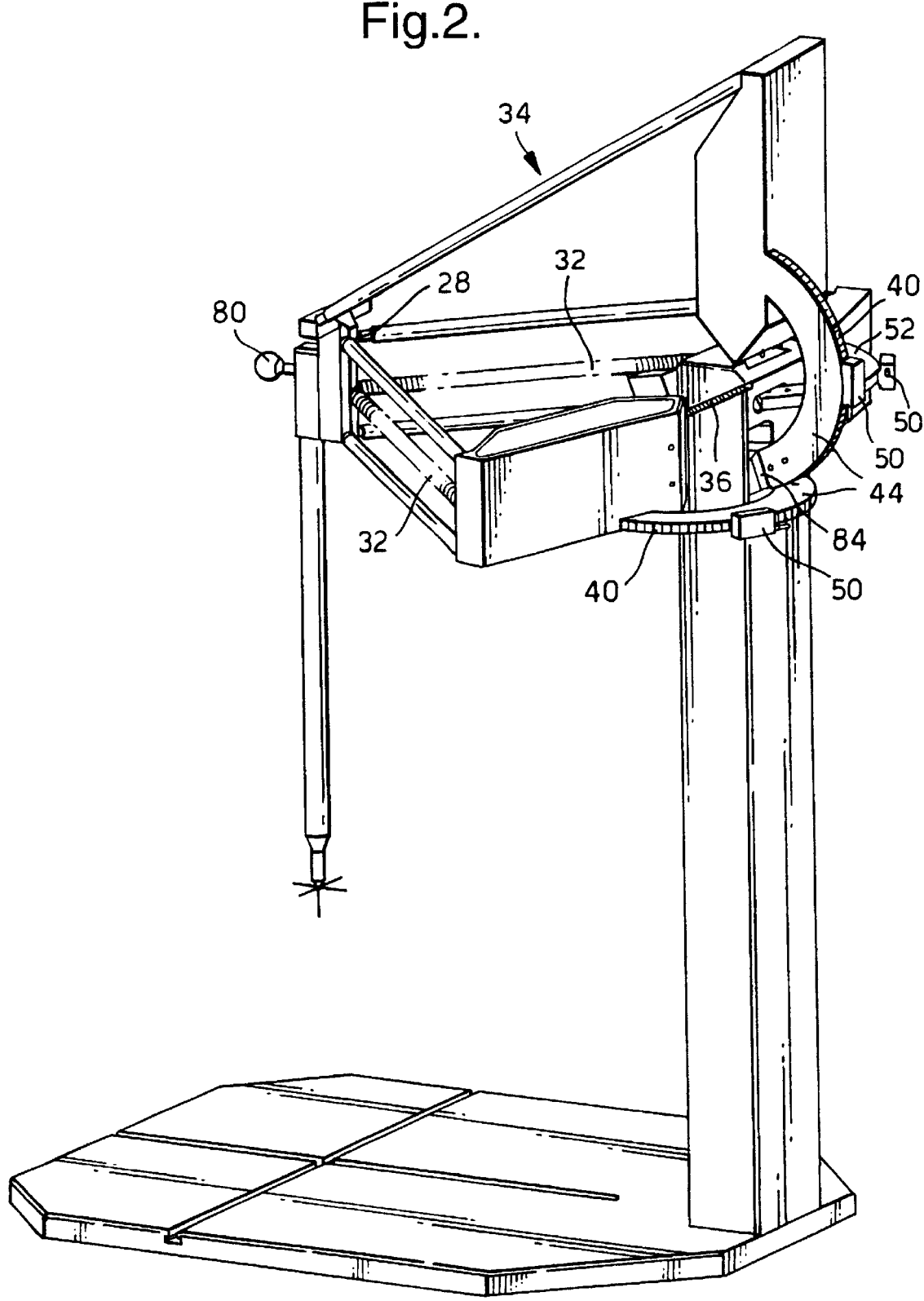
FIG. 2 is a rear perspective view of the machine of FIG. 1.

Referring now to FIGS. 1 and 2, a machine has an operating module provided by a touch probe 10 (which in the present example is a measuring probe or touch-trigger probe) suspended from a rigid arm 12, which is in turn mounted to a bracket 14, and a base provided by a table 16 and a pillar 20 which is rigidly mounted to the table 16. The operating module is supported for movement relative to the base with three translational degrees of freedom by means of three articulated linkages 18, each of which extends directly between the bracket 14 and the pillar 20.

Each of the linkages 18 has a pair of limbs, one of which is provided by a torsionally rigid box 22, pivotally mounted to the pillar 20 by means of a hinge, made up, in this example, of a pair of ball and socket joint 24 (ball and groove joints may also be used). The ball and socket joints 24 define an axis A of articulation of the limbs provided by the boxes 22. The freely pivoting end of each torsion box 22 is connected to the bracket 14 by means of a further limb provided by a pair of parallel struts 26. Each of the struts 26 is pivotally mounted by means of ball and socket joints 28 at one end to the bracket 14, and at the other end to the torsion box 22. The struts may therefore pivot relative to the torsion box 22 and the bracket 14 with two degrees of rotational freedom. Retention springs 32,34 urge all the elements of the ball and socket joints 24,28 respectively into mutual engagement, and facilitate simple and rapid assembly and dismantling of the linkages 18.

Each individual linkage 18 permits movement of the operating module relative to the base with three degrees of translational freedom, and two degrees of rotational freedom. As a result, when all three sets of linkages 18 operate in unison, the probe 10 may only translate relative to the pillar 20, since the two degrees of rotational freedom permitted by a given one of the linkages 18 are degrees of rotational freedom prevented by the combination of the other two.

Displacement of the operating module relative to a reference point, or "datum", whose position is fixed relative to the base, may be determined by means of three incremental opto-electronic encoders 38. Each encoder includes a scale 40, supported on a circular mounting surface of an arcuate arm 44. Each of the arms 44 extends rearwardly from a torsion box 22, and the centre of the circle defined by the profile of the mounting surface is substantially concentric with the axis A of articulation of the respective torsion box 22 (which is in turn defined by the positions of the ball joints 24). A readhead 50, carried on a bracket 52 which is rigidly connected to the pillar 20, is mounted in register with the scale 40, and pivoting movement of a torsion box 22 about an articulating axis A causes relative movement of the scale 40 and the readhead 50. This relative movement in turn causes the readhead 50 to generate a series of quadrature pulses which are processed and sent to an incremental counter (not shown). An example of such an encoder, and a manner of processing the quadrature pulses generated thereby are shown in, for example EP 0207121 and International Application No. WO87/07943 (the contents of each of which are hereby incorporated by reference). Cartesian coordinate values representing the displacement of the operating module from a predetermined datum may then be generated from the values of the counters provided in respect of each of the encoders 38 by appropriate mathematical manipulation.

Although in the present example, the encoders are provided by a scale and readhead on the base and the linkages, other arrangements are possible. For example it is equally possible for the scale and readhead to operate between two relatively pivotable parts of the linkages 18, or between a part of the linkages 18 and the operating module.

In operation the probe 10 is moved through the working area of the machine by the hand of an operator. A handle 80 is provided for this purpose, and is typically made of a thermally insulating material such as ceramic, to prevent transmission of heat to the machine. The handle 80 is preferably mounted to the bracket 14 via a mechanism (not shown) which prevents the transmission of torque, or the transmission of linear forces in excess of a predetermined threshold to the bracket 14. Alternatively, the handle 80 may be mounted to a mass counterbalancing mechanism, such as a mass counterbalancing mechanism of the type shown and subsequently described in FIG. 4 (for example).

Counterbalancing for the weight of the parallel struts 26, the bracket 14 and the various components of the operating module is provided for in the embodiment of FIG. 1 by a combination of (1) an articulated counterbalance arm 90, and (2) a counterbalancing lever provided by a weight 84 located on the free end of the arcuate scale arm 44 extending from the upper torsion box 22, and having a mass which offsets the center of mass of the upper torsion box 22 and half the mass of the top struts. The counterbalance arm 90 is pivotally mounted to the base of the machine at an end 92, and is connected for movement in the plane of the table 16 with the bracket 14 at its relatively free pivoting end 94 by a cable 96. The cable 96 is routed along the arm 90 by three pulleys 98, and the remote end of the cable (not shown) is connected to a weight, constant force spring, or a specially configured fusee (none of which are shown). If a fusee is employed, it is preferably subjected to a varying bias torque, e.g., a clock spring, or a varying tangential force, e.g. from a coil spring.

Horizontal movement of the bracket 14 and operating module is transmitted (due to the tension in the cable 96) to the arm 90, causing the free end 94 of the arm to move substantially in register with the bracket 14 in the horizontal plane. The special fusee configuration takes account of the changing upward biasing force required on the operating module with variation in the vertical position of the module. Horizontal movement of the operating module in a direction across the front of the pillar 20 does not cause any change in the required counterbalancing force provided by the articulating arm 90 and cable 96; the small degree of pivoting of the upper torsion box 22, and consequent alteration in the counterbalancing weight thereof being accounted for by the counterbalancing lever provided (in this example) by the weight mounted to scale arm of the upper torsion box 22. Movement of the operating module toward and away from the pillar 20 again results in no alteration of the requisite upward force provided by the articulating arm 90 and cable 96, but causes a substantial change in the weight of the upper torsion box 22 requiring counterbalance; this again being provided continually by the weight associated therewith.

Figure 3:
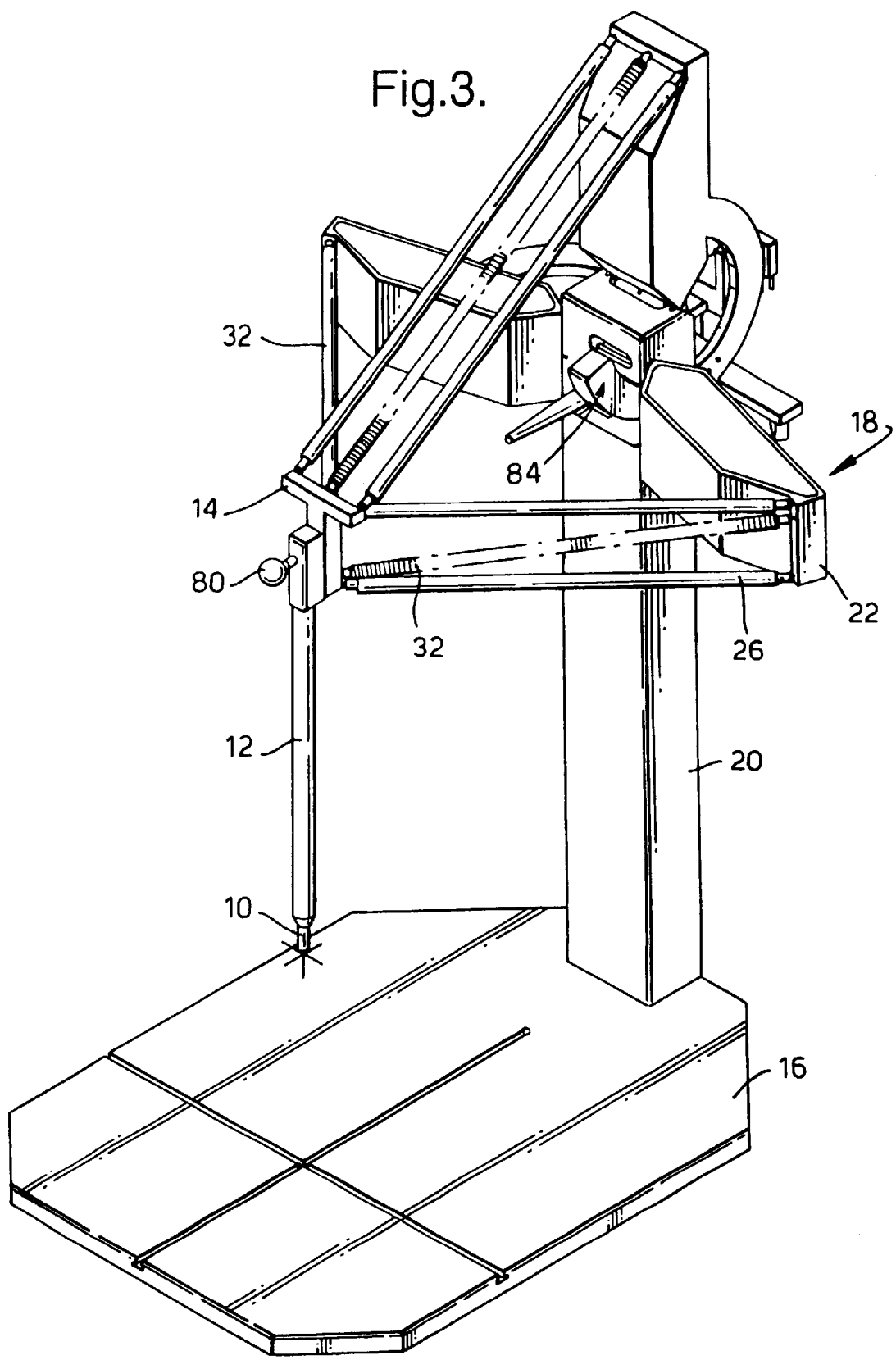
FIG. 3 is a perspective view of a second embodiment of machine.

In an alternative counterbalancing configuration shown in FIG. 3, the articulating arm 90 may be dispensed with, and in its place the retention springs 32 are configured to extend diagonally from one parallel strut 26 to another.

In either of these schemes, the machine has the property of "neutral equilibrium". That is to say, that, at any position within its operating envelope, when the operator releases handle 80 on the operating module, the counterbalancing forces on the module will prevent further movement.

In the embodiments of the present invention illustrated herein, the pivoting axes of the hinges of adjacent torsion boxes 22 extend perpendicular to each other. Alternative configurations are possible, such as, for example, the pivoting axes extending at 120°. Furthermore, various aspects of the present invention have been exemplified by the illustration of a machine in which the articulating linkages 18 extend horizontally from an upwardly extending vertical pillar 20. However, various aspects of the present invention may be embodied in a machine in which the articulating linkages 18 are mounted such that they extend vertically downward, for example.

Figure 4:
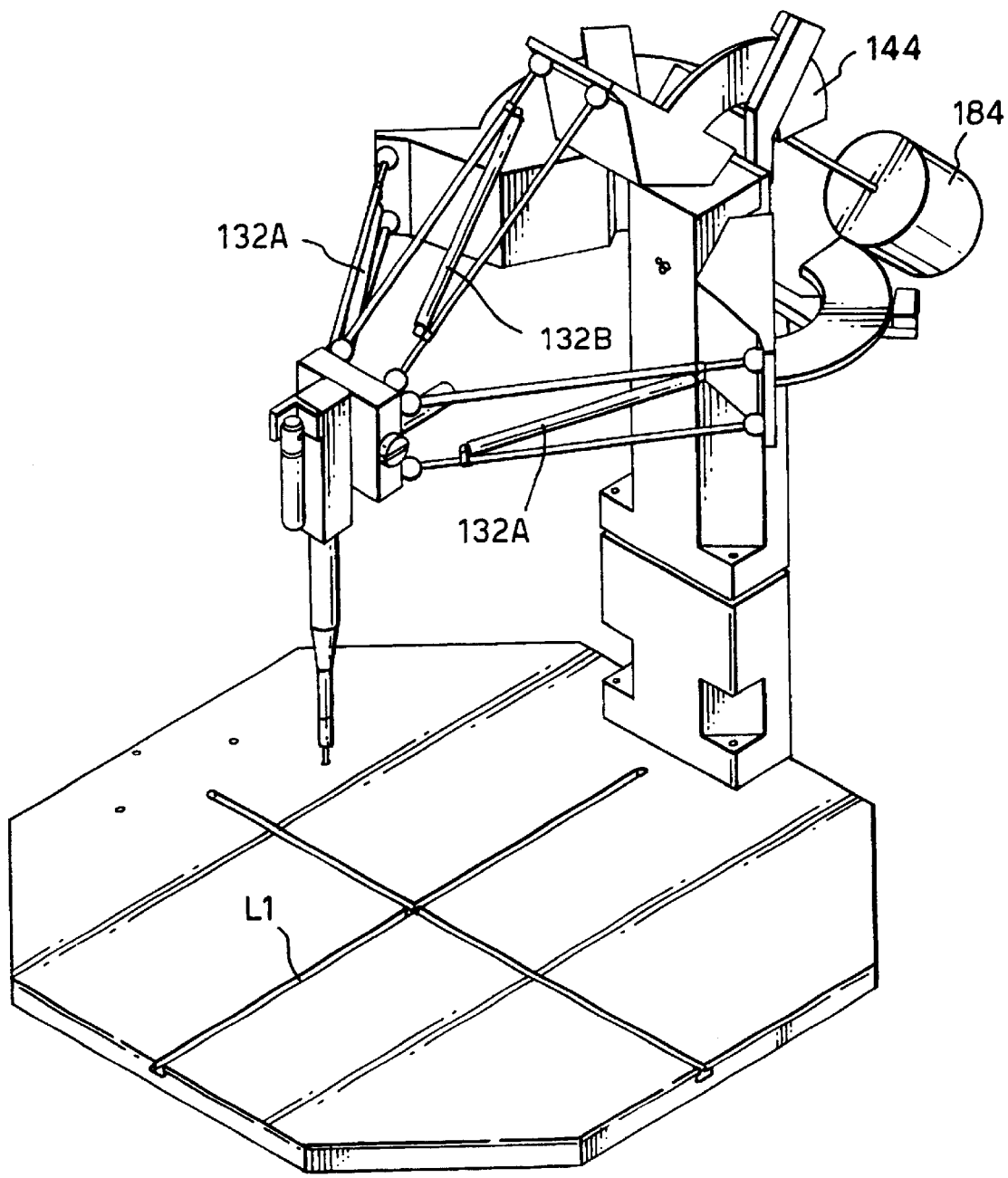
FIG. 4 is a perspective view of a third embodiment of machine.

In the modified embodiment of FIG. 4, counterbalance springs 32 are replaced by releasable locking members 132A (which in the illustrated example are telescopic) which, when locked, effectively transform into rigid rods. Actuation of the locking mechanism in the members 132A thus has the effect of holding the operating module on a plane parallel to the table, and whose vertical displacement above the table is determined by the vertical displacement of the operating module when the locking mechanism is actuated. This is useful, for example, when the operating module includes a scanning probe, and it is desired to scan the surface profile of an object in a series of parallel horizontal planes. A third releasably lockable telescopic member 132B, is provided to enable motion of the operating module to be locked in vertical plane of any desired displacement within the operating envelope of the machine, and extending parallel to the line L1 in FIG. 4. Also illustrated in FIG. 4 is the counterbalancing mass 184, attached to the scale arm 144.

What is claimed is:

1. A manual coordinate positioning machine comprising:
   a fixed structure including a base on which a workpiece may be positioned;
   an arm for carrying a measurement probe;
   three pivotable linkages interconnecting the fixed structure and the arm, and which cooperate to prevent relative rotation of the base and the arm, but permit relative linear motion thereof,
   a counterbalancing device which acts to suspend the arm relative to the base against the action of gravity;
   wherein motion of the arm is determined by rotary encoders mounted to measure the pivoting motion of the linkages.

2. A manual coordinate positioning machine according to claim 1, wherein the fixed structure includes a pillar extending away from the base, the base, in use, supports an object which is to be operated on by the operating module, and the linkages extend transversely from the pillar to the arm so that during motion of the arm relative to the pillar the operating module traverses the base.

3. A manual coordinate positioning machine according to claim 2, wherein the pillar extends vertically from the base, two of the linkages each being pivotally connected to the pillar with one degree of rotational freedom about a vertical axis and extending horizontally away form the pillar, the third linkage being pivotally connected to the pillar with one degree of freedom about a horizontal axis, a further counterbalancing device being included comprising a counterbalance mass connected to the third linkage and being disposed at least in part on the opposite side of the horizontal axis to the linkage to provide a counterbalancing force offsetting at least a part of the mass of the third linkage.

4. A manual coordinate positioning machine according to claim 3, wherein the counterbalancing device includes a part which acts on the same side of the horizontal axis as the linkage and wherein a center of mass of the counterbalancing device moves towards and away from the horizontal axis as the linkage pivots whereby the counterbalancing force is continuously variable.

5. A manual coordinate positioning machine according to claim 4, wherein the further counterbalancing device is an arcuate extension to the second limb of the third linkage.

6. A manual coordinate positioning machine according to claim 5, wherein at least part of the arcuate extension of the third linkage is arranged to produce a counterbalance force offsetting at least a part of the mass of the third linkage.

7. A manual coordinate positioning machine according to claim 3, wherein the two horizontal linkages each comprise first limbs in the form of a pair of elongate struts disposed one above the other, and include tension springs disposed between the struts and extending from a point on the arm adjacent the lower of the two struts to a point on the second limb adjacent the higher of the two struts thereby producing an upward force for counterbalancing at least part of the masses of the arm and the two struts.

8. A manual coordinate positioning machine according to claim 1, wherein each linkage has first and second limbs which are pivotally interconnected with two degrees of rotational freedom, the first limb comprising a pair of elongate struts which are pivotally mounted at one end with two degrees of rotational freedom to the arm, and at the other end to the second limb, the second limb being pivotally mounted to the fixed structure and the arm with one degree of freedom.

9. A manual coordinate positioning machine according to claim 1, wherein said counterbalancing device comprises an independent articulating link, pivotally mounted at one of its ends to said fixed structure for movement in the plane of the base, and a cable routed along the articulating link, said cable being connected at one end to the arm and at the other end to means producing a counterbalance force.

10. A manual coordinate positioning machine according to claim 1, wherein each linkage includes first and second limbs which are pivotally interconnected with two degrees of rotational freedom, one of said first and second limbs of each linkage being pivotally connected to the fixed structure with one degree of rotational freedom and having an arcuate extension which forms a mounting substrate for mounting a scale which forms part of at least one of said rotary encoders.

* * * * *